Figure 1:
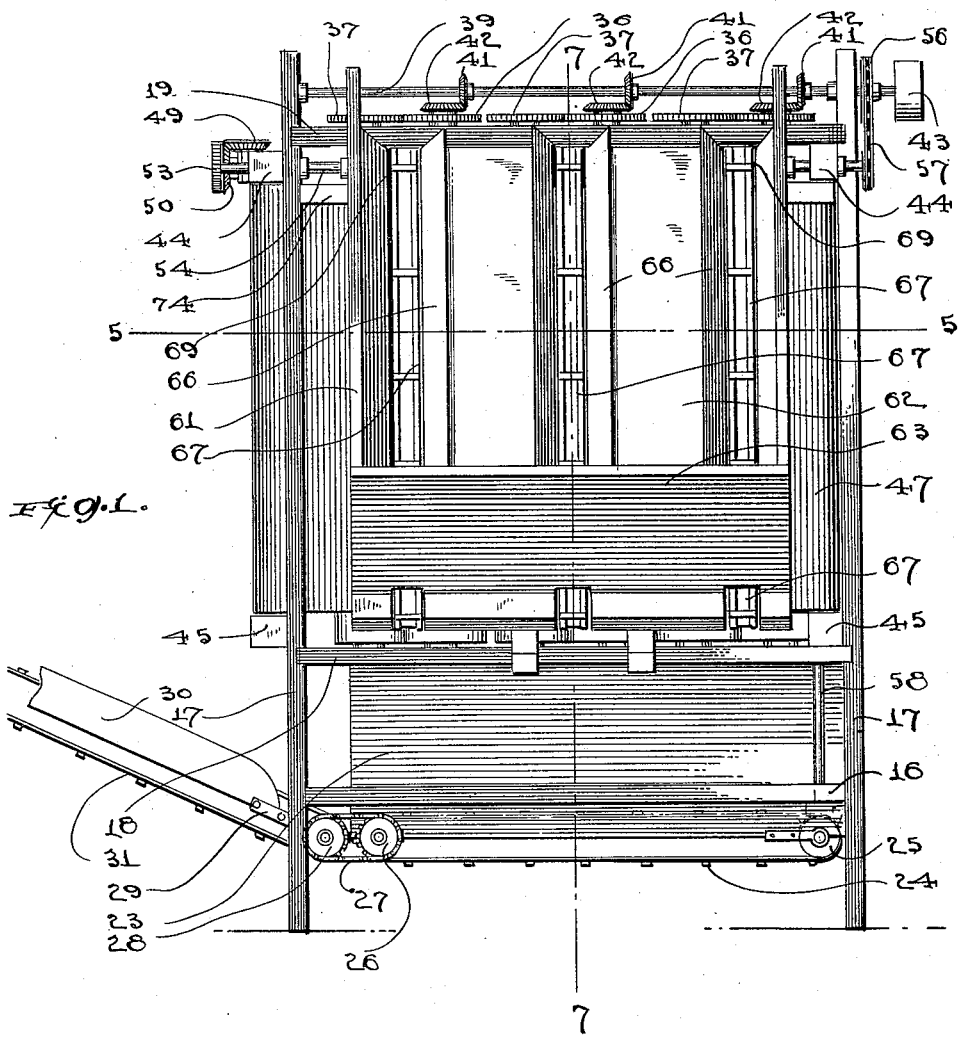

T. STEICHEN.
CORN HUSKING MACHINE.
APPLICATION FILED JAN. 14, 1913.

1,077,313.

Patented Nov. 4, 1913.

4 SHEETS—SHEET 1.

WITNESSES

INVENTOR
Theodore Steichen
By E. E. Vrooman, his Attorney.

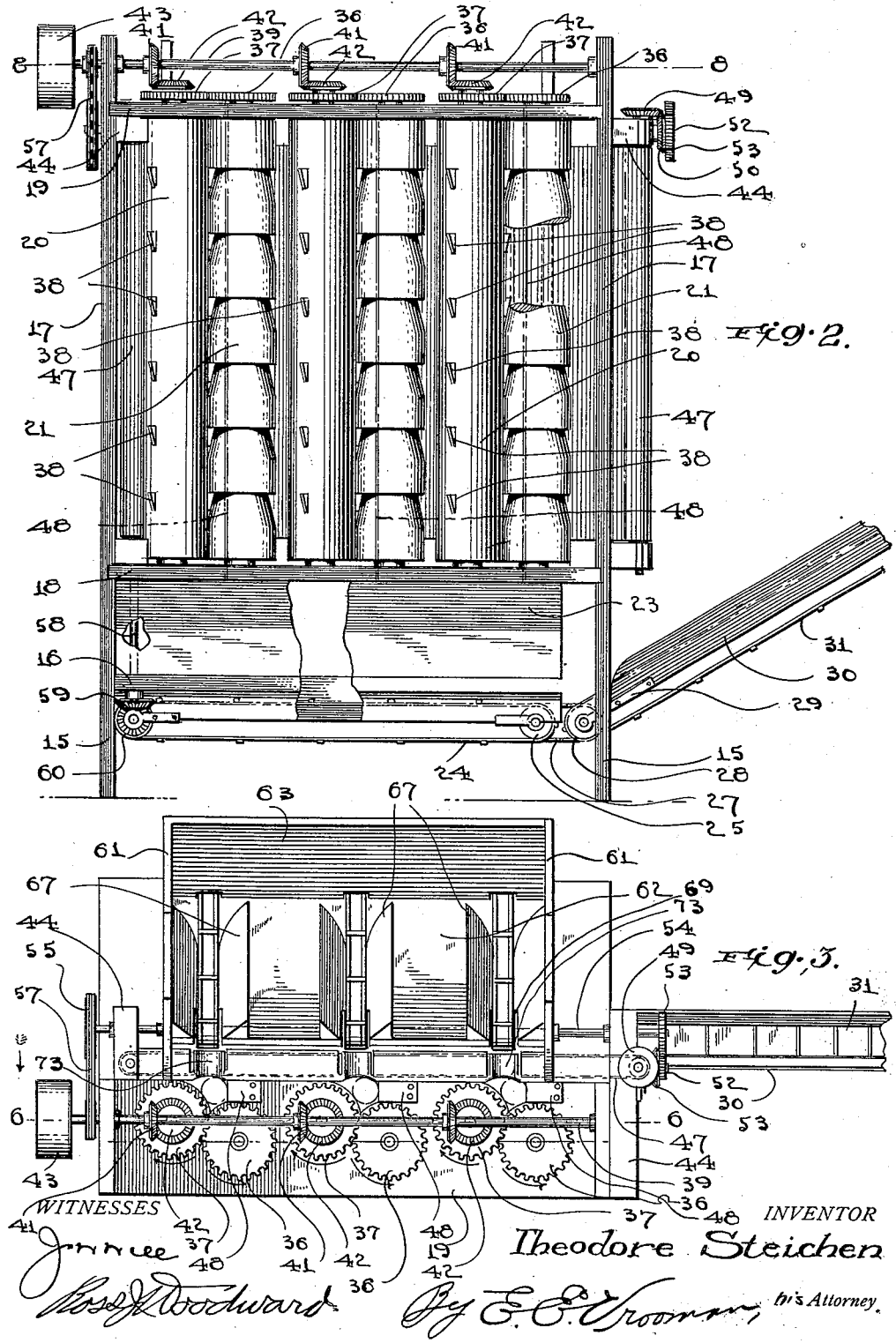

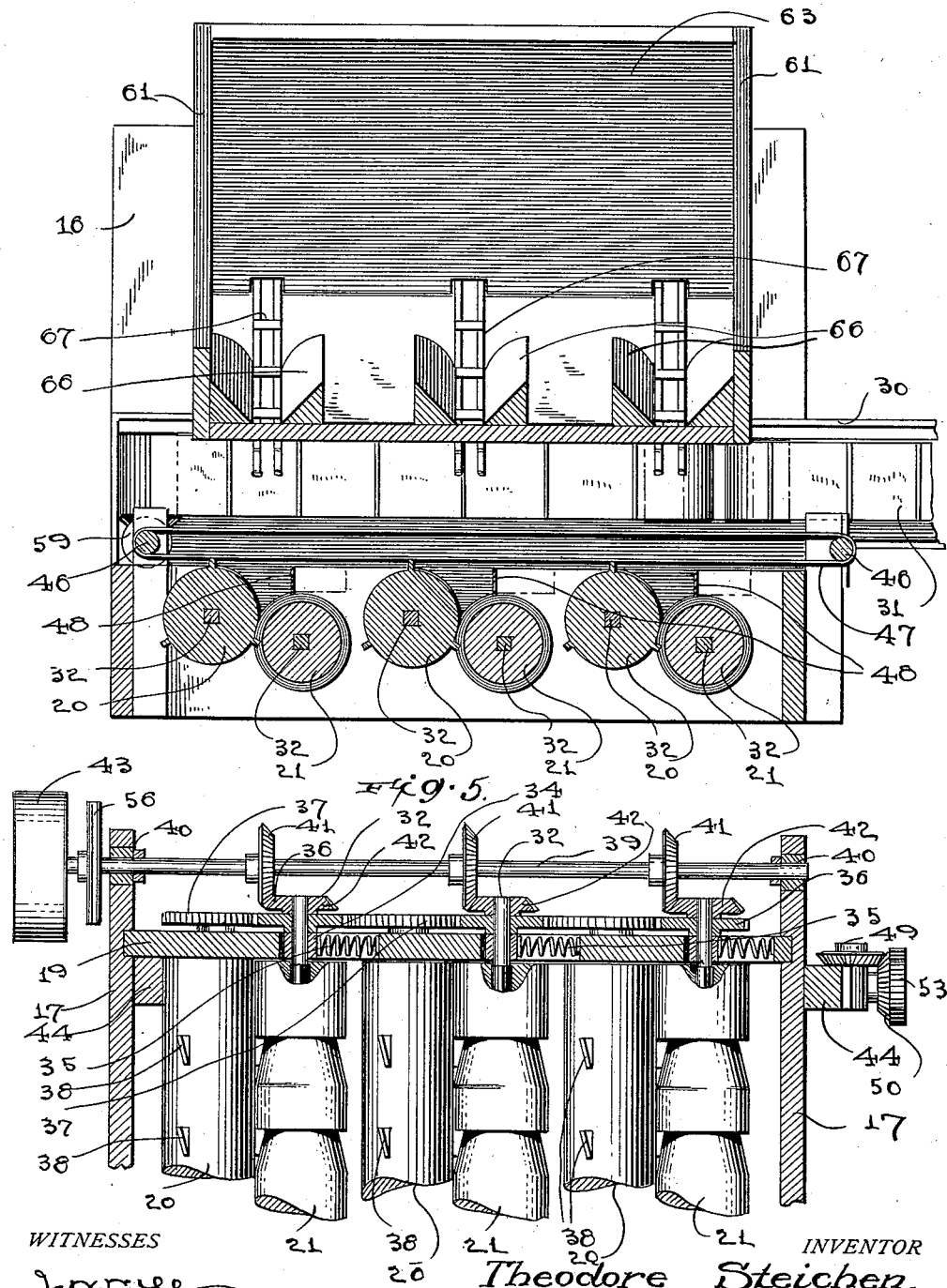

T. STEICHEN.
CORN HUSKING MACHINE.
APPLICATION FILED JAN. 14, 1913.
1,077,313.
Patented Nov. 4, 1913.
4 SHEETS—SHEET 4.
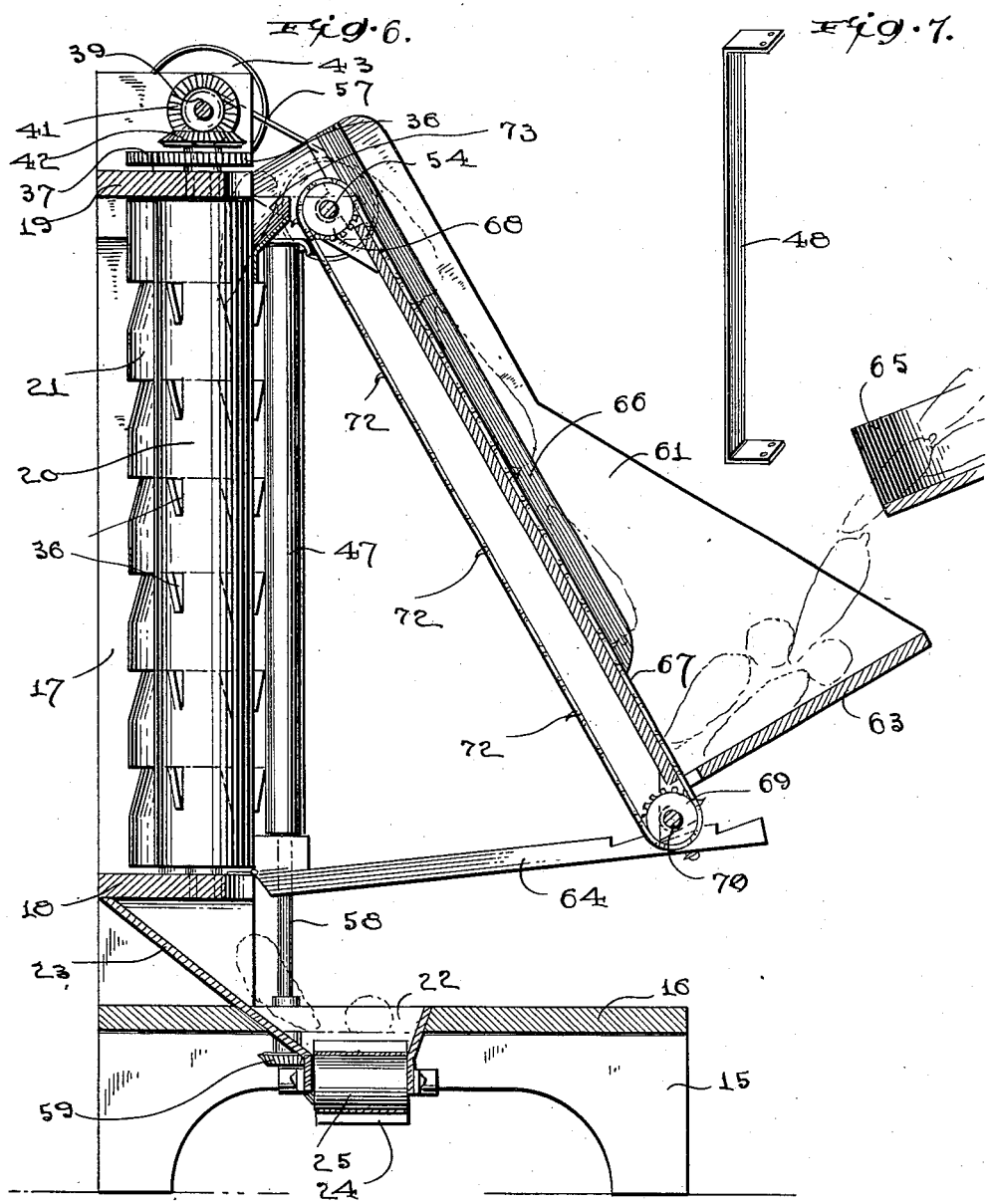
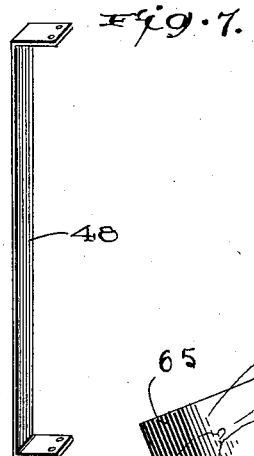
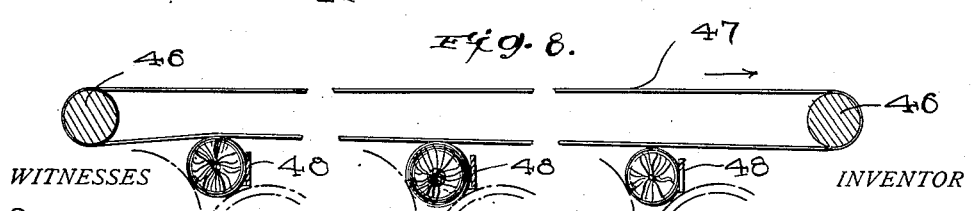

UNITED STATES PATENT OFFICE.

THEODORE STEICHEN, OF ALTON, IOWA.

CORN-HUSKING MACHINE.

1,077,313.  Specification of Letters Patent.  Patented Nov. 4, 1913.

Application filed January 14, 1913. Serial No. 741,975.

*To all whom it may concern:*

Be it known that I, THEODORE STEICHEN, a citizen of the United States, residing at Alton, in the county of Sioux and State of Iowa, have invented certain new and useful Improvements in Corn-Husking Machines, of which the following is a specification, reference being had therein to the accompanying drawing.

This invention relates to a machine which is used for removing the shuck from an ear of corn.

The principal object of the invention is to provide an improvement of the class specified which is so constructed that the ears of corn will be fed into the machine in the right position for removing the shuck and in which the shuck will be entirely removed from the ear, and the ear of corn then dropped into a trough through which a traveling conveyer passes for carrying the ear of corn to a suitable receptacle.

Another object of the invention is to provide an improved type of husk removing machinery so that the husk will be entirely removed without damage to the ear of corn.

Another object of the invention is to provide an improved means for holding the ear in the proper position for removing the husk.

Another object of the invention is to provide an improved means for yieldably holding certain of the husk removing rollers in their proper position, thus permitting the rollers to have enough give to permit an ear of corn to pass through the rollers if by any chance it should become jammed between two of the rollers.

With these and other objects in view this invention consists of certain novel combinations, constructions, and arrangements of parts as will be hereinafter fully described and claimed.

In the accompanying drawings:—Figure 1 is a front elevation of the corn husking machine. Fig. 2 is a rear elevation of the husker. Fig. 3 is a top plan view. Fig. 4 is a sectional view along the line 5—5, in Fig. 1. Fig. 5 is a sectional view through the upper portion of the machine along the line 6—6, in Fig. 3. Fig. 6 is a vertical sectional view through the machine along the line 7—7, in Fig. 1. Fig. 7 is a perspective view of one of the vertical springs which assists in holding the ears of corn in the proper position while the shuck is being removed. Fig. 8 is a diagrammatic view showing the manner in which the ears of corn are held while the shuck is being removed.

Referring to the accompanying drawings it will be seen that this invention comprises the base having the side bars 15 which are connected by the base board 16 and from which there extends the vertical sides 17 which are connected by the cross bars 18 and 19. The cross bars 18 and 19 not only connect the sides 17 but also form supports for the rollers 20 and 21 which will be described in detail farther on. A trough 22 is mounted beneath an opening running transversely of the base board 16 and is provided with a guiding plate 23 which extends beneath the cross bar 18 in order to guide the ears of corn into the trough 22. The bottom of the trough 22 is formed of an endless conveyer belt 24 which travels around pulleys 25, thus carrying the ears of corn to one side of the base board. A sprocket wheel 26 is mounted upon the shaft of one of the pulleys 25 and is connected by a sprocket chain 27 with a sprocket wheel 28 mounted in bearings 29 at the lower end of a trough 30 through which an endless conveyer belt 31 passes. This conveyer belt 31 passes over pulley wheels mounted at the ends of the trough 30, one of the pulley wheels being mounted upon the shaft of the sprocket wheel 28. It will thus be seen that the traveling of the endless conveyer belt 24 will cause the endless conveyer belt 31 to also travel through its trough 30, thus conveying the ears of corn up the trough and depositing them in a suitable receptacle.

The rollers 20 and 21 are rotatably mounted between the cross bars 18 and 19. The rollers 21 have their pivot pins 32 passing through slots 33 in the cross bar 19 and carry bearing blocks 34 which are engaged by the springs 35 to normally hold the rollers 21 in a vertical position. By this construction the rollers 21 are permitted to have a certain amount of give so that if an ear of corn becomes jammed between the rollers 20 and 21 the roller 21 may have sufficient give to permit the corn to pass between the rollers. Gear wheels 36 are mounted upon the pins 32 and mesh with the gear wheels 37 mounted upon the pivot pins of the rollers 20 to cause the rollers 20 to be rotated in unison with the rollers 21. It should be noted that these rollers 20 are provided with a plurality of teeth 38 which are so positioned that when the rollers 20 and 21 are rotating the teeth 38 will pass the reduced portions of the rollers 21. It should also be noted that these teeth are provided with beveled outer edges which will assist in causing the ears of corn to be worked gradually downward as the shuck is removed.

A power shaft 39 is rotatably mounted in bearings 40 above the cross bar 19 and is provided with beveled gears 41 which mesh with the beveled gears 42 mounted upon the pins 32. When this power shaft 39 rotates it will cause the rollers 21 and 20 to be rotated, thus causing the teeth 38 to catch the corn shucks and remove them from the ears of corn. A pulley wheel 43 is mounted upon the outer end of the power shaft, thus permitting the power shaft to be rotated by a belt or other suitable means leading from a source of power.

Upper and lower supporting bars 44 and 45 are secured to the side bars 17 and form bearings for the vertical rollers 46 around which the endless conveyer belt 47 passes. This conveyer belt 47 travels close to the inner faces of the rollers 20 and 21 and engage the ears of corn as shown in Fig. 8 to hold the ears of corn against the resilient strips 48 which are secured to the upper and lower bars 18 and 19 in such a position that the teeth 38 can readily engage the corn shucks. It will be noted that by an inspection of Fig. 8 that the ears of corn do not pass into the space between the rollers 20 and 21 a sufficient degree to permit the ears to be jammed and that, therefore, there is no danger of the machine being clogged and prevented from operating. The slots 33 and springs 35, however, have been provided to permit a very small ear to pass through the rollers in case a small ear is placed in the machine and passes between the rollers 20 and 21 to such an extent that it would be jammed if it were not for this provision. A beveled gear 49 is mounted upon the pivot pin of one of the rollers 46 and meshes with a beveled gear 50 mounted upon a stub shaft 51 carried by the upper bar 44. A gear wheel 52 is mounted upon this stub shaft 51 and meshes with a gear wheel 53 mounted upon a shaft 54. This shaft 54 extends transversely across the machine with its end portions journaled in the strips 44 and is provided at one end with a sprocket wheel 55 which is connected with a sprocket wheel 56 mounted on the power shaft 39 by a sprocket chain 57. It will, therefore, be seen that the power shaft rotates the rollers 20 and 21 and through the sprocket chain 57 transmits power to the shaft 54, which shaft in its turn transmits power to the conveyer 47 through the medium of the gear wheels 52 and 53 and beveled gears 49 and 50. The shaft 58 of one of the rollers 46 extends beneath its supporting bar 45 and is provided with a beveled gear 59 meshing with a beveled gear 60 mounted upon the axle of the rollers 25. Power, will therefore, be transmitted to the conveyer 24 when the power shaft is in motion and thus the entire portion of the machine so far described is operated by power transmitted from the power shaft.

A frame comprising the side bars 61 and connecting plate 62 and bottom 63 is pivotally mounted upon the shaft 54 by having the shaft pass through the side bars and is held in the desired incline by having its lower edge resting in a selected notch of the bracing bar 64. This frame forms a hopper in which the ears of corn are dumped from a chute 65 and is divided into a plurality of troughs 66 through which the conveyer chains 67 pass. These conveyer chains pass over sprocket wheels 68 rigidly mounted upon the shaft 54 and also around sprocket wheels 69 mounted upon a shaft 70 journaled in bearings 71 at the lower end of the hopper. The chain conveyers 67 are provided with spurs 72 which spurs engaging catch into the leaves forming the shucks for the ears of corn and draw the ears up the troughs 66 until the ears reach the top where they will fall over the upper edge of the trough and on to the spouts 73 struck from the metal plate 74 and secured to the supporting bars 44 above the rollers 46. These spouts are positioned opposite the spaces between the sets of rollers 20 and 21 and to one side of the resilient strips 48. Therefore, when the ears of corn fall onto the spouts 73 they will be guided into the space between the rollers and, therefore, in the proper place for the shucks to be removed.

From the above description it will be seen that the ears of corn are dumped into the hopper and are then carried up the trough 66 by the conveyer chains 67 until they reach the top and will then fall into the spouts 73 and be guided into the space between the conveyer belt 47 and the rollers 20 and 21. The belt 47 will hold the ears of corn tightly against the resilient strips 48 and the teeth 38 will catch the leaves forming the shucks and tear them off carrying them through to the outside of the rollers where they will drop either upon the ground or a suitable receptacle. The ear of corn gradually works downwardly until when all the shucks have been removed it falls into the trough 22 upon the conveyer belt 24, which belt carries them to the conveyer belt 31 traveling through the trough 30. This belt 31 will carry the ears of corn up the trough 30 and dump them into a suitable receptacle. A machine has, therefore, been provided which will remove the shuck from the ear of corn and then deposit the clean ear into the trough through which a traveling conveyer belt passes to carry the ears to a suitable receptacle provided to receive them.

Having thus described the invention what is claimed as new, is:—

1. A corn husking machine comprising a frame, husking rollers rotatably mounted in said frame, a traveling apron carried by said frame and extending parallel to said rollers, resilient strips carried by said frame and positioned between said rollers and apron for holding ears of corn in the proper position to be operated upon by said rollers, and operating means for said rollers and apron.

2. A corn husking machine comprising a frame, husking means carried by said frame, an apron extending substantially parallel to said husking means and movable transversely thereof, and means between said apron and husking means for holding an ear of corn in the proper position to be operated upon by said husking means.

In testimony whereof I hereunto affix my signature in presence of two witnesses.

THEODORE STEICHEN.

Witnesses:
C. W. PITT,
M. E. GIBBS.

Copies of this patent may be obtained for five cents each, by addressing the "Commissioner of Patents, Washington, D. C."